Patented Sept. 21, 1937

2,093,958

UNITED STATES PATENT OFFICE 2,093,958

RECOVERY OF GOLD AND/OR SILVER FROM ORES AND METALLURGICAL PRODUCTS

Victor Thomas Edquist, Melbourne, Victoria, Australia

No Drawing. Application October 15, 1936, Serial No. 105,809. In Australia August 6, 1936

5 Claims. (Cl. 75—103)

This invention relates to the recovery of gold and/or silver from ores and metallurgical products.

The invention is applicable for the recovery of gold and silver from ores and metallurgical products containing copper compounds which it would not otherwise be possible to treat economically by reason of the excessive cyanide consumption.

It is known that a copper ammonium cyanide is a solvent for gold. The present invention includes means for preparing the said solvent and its application in the treatment of the ores and metallurgical products.

The invention includes the treatment of the foregoing materials with a soluble cyanide in the presence of ammonia and copper carbonate added externally of or to the material to be treated. For example finely divided copper carbonate may be dissolved in a solution of an alkaline cyanide and this solution used to treat an alkaline ore pulp containing free ammonia. Alternately the copper carbonate may be added to the ore or other material which will then be treated with an alkaline cyanide in the presence of ammonia. The application of the invention will readily be understood by reference to the following practical examples thereof.

Gold-bearing ore slime assaying 36.25 dwts. gold and approximately 8% copper in oxidized form was mixed with water to form a pulp containing one part of solids to two of water. To this pulp lime was added to produce an alkalinity of 0.02% CaO. Then ammonium sulphate equal to 4 lbs. per ton of solids was introduced and the pulp agitated for two hours.

Following this, there was added a solution of copper cyanide containing the equivalent of 2.5 lbs. of KCN per ton of solids in the pulp.

Agitation of the whole was continued for 24 hours, after which over 95% of the gold was found in solution, the residue assaying 1.56 dwts. gold.

The copper cyanide was prepared by dissolving 1.4 lbs. of copper sulphate in water, adding 0.6 lb. of sodium carbonate, thus precipitating the copper as a carbonate, and then adding 1.0 lb. of potassium cyanide in solution which dissolved the copper carbonate.

In another case a refractory and highly pyritic ore slime assaying 2 dwts. gold and 0.25% copper, part of which had been converted by weathering to water soluble copper sulphate was treated. With alkaline cyanide a recovery of 0.3 dwt. of gold was obtained, the cyanide consumption being 5 lbs. KCN per ton. Treated with ammonium-copper-cyanide in the manner described an extraction of 1 dwt. was obtained with a total KCN consumption of 0.5 lb. per ton.

Although the best results have been obtained by adding the copper cyanide to the ore pulp containing ammonia the ammonium-copper-cyanide may be prepared outside the pulp by adding ammonia to the copper cyanide. Further the ore or slime pulp may have copper carbonate added thereto, the pulp made alkaline, the ammonium salt added and finally the alkaline cyanide introduced. The dissolving salt produced is probably a cuprosocupric ammonium cyanide, the possible formula for which is:

$$x(NH_3)\, y(CuCy_2)\, z(Cu_2Cy_2)$$

However, in every case preparation of the solvent of the gold and silver requires the use of copper carbonate.

It may be stated generally that the best results are obtained by the gradual addition over a period of hours of the copper cyanide to the prepared ore pulp or by its addition in three or more parts at intervals of two to four hours. It will be obvious that to obtain the most beneficial result a few tests to indicate the influence of varying periods of treatment will be advisable.

It will further be obvious that in each case the solution containing the gold and/or silver will be stripped of its gold contents such as by the use of zinc dust or charcoal.

I claim:

1. Improvements relating to the recovery of gold and/or silver from metallurgical products comprising the addition of carbonate of copper to the pulp and then treating the same with a solution of a soluble cyanide in the presence of ammonia.

2. Improvements relating to the recovery of gold and/or silver from metallurgical products comprising the treatment of the ore with a solution of copper carbonate in an alkaline cyanide solution to which ammonia is added.

3. Improvements relating to the recovery of gold and/or silver from metallurgical products comprising the treatment of an ore pulp containing ammonia with a solution obtained by dissolving copper carbonate in a solution of an alkaline cyanide.

4. Improvements relating to the recovery of gold and/or silver from ores and metallurgical products comprising the addition of an ammonium salt to the alkaline ore pulp thereby setting free ammonia and the subsequent treatment of the said pulp by a solution in which copper carbonate has been dissolved in an alkaline cyanide.

5. Improvements relating to the recovery of gold and/or silver from ores and metallurgical products comprising adding an alkaline carbonate to a solution of a copper salt, then adding an alkaline cyanide to dissolve the precipitated copper carbonate, adding ammonia to the said solution and finally using the reagent formed to extract the precious metals.

VICTOR THOMAS EDQUIST.